J. HUTCHINS.
MEASURING INSTRUMENT.
APPLICATION FILED AUG. 27, 1921.

1,420,105.

Patented June 20, 1922.

Inventor
JOHN HUTCHINS
By Richard J. Cook
Attorney

UNITED STATES PATENT OFFICE.

JOHN HUTCHINS, OF AUBURN, WASHINGTON.

MEASURING INSTRUMENT.

1,420,105.  Specification of Letters Patent.  Patented June 20, 1922.

Application filed August 27, 1921. Serial No. 495,891.

*To all whom it may concern:*

Be it known that I, JOHN HUTCHINS, a citizen of the United States, and a resident of the town of Auburn, county of Pierce, State of Washington, have invented certain new and useful Improvements in Measuring Instruments, of which the following is a specification.

My invention relates to instruments for measuring minute distances, or apparent diameters and more particularly to a device of that character for measuring the thicknesses of thin metal plates, shafts, paper sheets, etc.; the principal object of the invention being to provide an instrument of the above character comprising an indicator hand that is movable adjacent a finely graduated dial to designate visibly to the fractional part of an inch the thickness of an article being measured.

Other objects of the invention reside in the details of construction and in the combination of parts embodied in the device.

In accomplishing these and other objects of the invention, I have provided the improved details of construction, the preferred forms of which are illustrated in the accompanying drawings, wherein—

Figure 1:
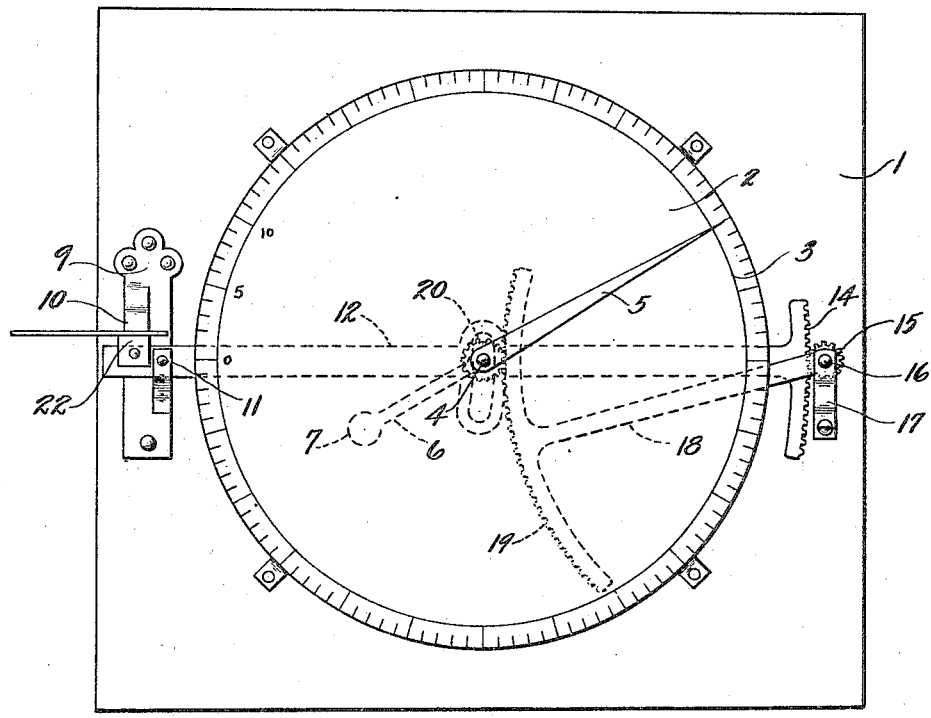
Figure 1 is a front elevation of a measuring instrument constructed according to the present invention.
Figure 2:
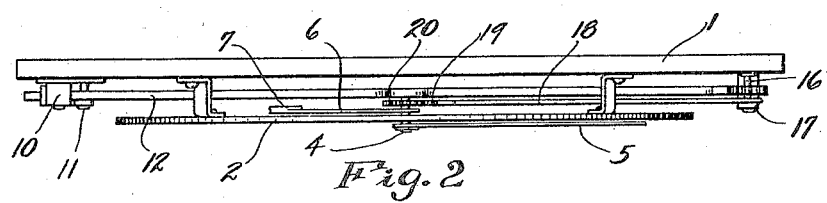
Figure 2 is a top view of the same.
Figure 3:
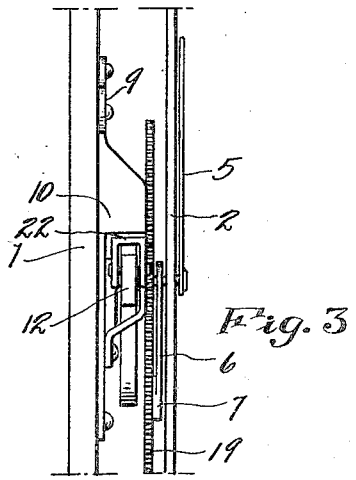
Figure 3 is a side view of a part of the device, illustrating the abutment against which objects are placed for measurement, and the manner of supporting the main lever.

Referring more in detail to the drawings—

1 designates a vertically disposed supporting board upon which is mounted, in spaced relation thereto, a dial 2 having marked graduations as at 3, about the periphery thereof which are for the purpose of designating thicknesses in fractional parts of an inch of objects measured by the device.

Rotatably supported between the board 1 and dial 2 and extending forwardly from the latter at the center thereof, is a shaft 4 and fixed to the outer end of this shaft is a pointer 5 having its outer end disposed adjacent to and adapted to follow along the graduations 3. On the inside of the dial, a lever arm 6 is fixed to the shaft which is provided at its end with a weight 7 which serves as a counterbalance for the pointer.

Fixed to one side of the board 1, at the same horizontal level as that of the shaft 4, is a plate 9, having a projecting abutment 10 formed thereon, and supported pivotally from the plate by means of a pin 11 is a lever arm 12 having one end extending beneath the said abutment and its opposite end extended back of the dial and to the opposite side of the board, and provided at that end with a segmental rack 14 which is adapted to move in mesh with a gear wheel 15 fixed on an arbor 16 supported from the board and a bracket 17 fixed thereto. An arm 18 is fixed to the arbor to extend toward the shaft 4 and this is provided at its outer end with a geared segment 19 which moves in mesh with a gear wheel 20 fixed on the shaft 4.

Pivotally mounted on the end of the lever arm 12, beneath the abutment 10, is a block 22 which is adapted to flatly engage the under side of the abutment 10.

Figure 4:
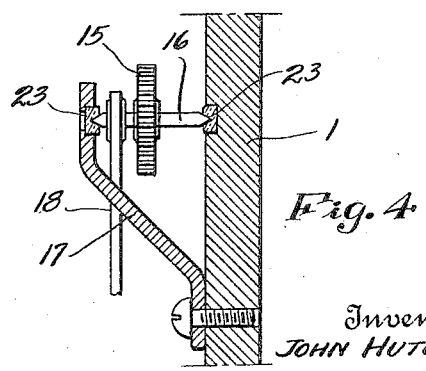
Figure 4 is a detail view, enlarged, showing in section the manner of mounting the geared segment.

It is desired that the shaft 16 and other mountings where possible be set in jewel bearings 23 as is shown in Figure 4 in order to eliminate as much friction as is possible.

When the device is at rest, the block 22 seats against the abutment 10 and the pointer is disposed at the 0 mark on the graduated surface. When an object is to be measured, it is placed between the block and abutment, and the movement of the longer part of the lever 12 will rotate the shaft 16 to cause movement of the pointer to designate the thickness of the object.

Such an instrument is very desirable as it gives an accurate, visible reading in fractional parts of an inch, and the different parts could be so balanced that its operation would be easy and the readings accurate.

Having thus described my invention, what I claim as new therein and desire to secure by Letters Patent, is:

A device of the class described comprising in combination, a base member, a graduated dial fixed in spaced relation to the base, an abutment fixed to the base at one side of the dial, a lever pivotally supported adjacent the abutment and having a block pivotally mounted thereon relatively close to said pivot point of the lever and adapted to cooperate with the abutment to receive objects for measurement between the same, said lever having a relatively long end portion provided with a gear segment at its end, a shaft rotatably mounted centrally of the dial, a gear wheel fixed on said shaft, a pointer fixed on said shaft and adapted on rotation of the latter to follow the graduations of said dial, an arbor pivotally supported from the base and having a gear wheel thereon in mesh with said gear segment at the end of the lever, and an arm fixed to said arbor and having a geared segment at its end meshing with the gear fixed on the pointer supporting shaft for the purpose set forth.

Signed at Seattle, Washington, this 22nd day of August 1921.

JOHN HUTCHINS.